(12) United States Patent
Mori et al.

(10) Patent No.: US 10,781,736 B2
(45) Date of Patent: Sep. 22, 2020

(54) EXHAUST PURIFICATION SYSTEM OF INTERNAL COMBUSTION ENGINE

(71) Applicant: TOYOTA JIDOSHA KABUSHIKI KAISHA, Toyota-shi (JP)

(72) Inventors: Toshihiro Mori, Gotemba (JP); Hiroshi Kobayashi, Numazu (JP); Masataka Ogushi, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 7 days.

(21) Appl. No.: 16/254,956

(22) Filed: Jan. 23, 2019

(65) Prior Publication Data
US 2019/0234268 A1    Aug. 1, 2019

(30) Foreign Application Priority Data
Jan. 30, 2018 (JP) .................. 2018-013805

(51) Int. Cl.
*F01N 3/20* (2006.01)
*F02D 41/14* (2006.01)
(Continued)

(52) U.S. Cl.
CPC .......... *F01N 3/206* (2013.01); *B01D 46/006* (2013.01); *B01D 46/0027* (2013.01);
(Continued)

(58) Field of Classification Search
CPC .......... B01D 2251/208; B01D 2279/30; B01D 46/0027; B01D 46/006; B01D 53/9431; B01D 53/9495; F01N 2610/04; F01N 2610/146; F01N 2900/1402; F01N 2900/1818; F01N 3/0253; F01N 3/035; F01N 3/103; F01N 3/206; F01N 9/002;
(Continued)

(56) References Cited

U.S. PATENT DOCUMENTS 6,438,945 B1 * 8/2002 Takagi .................. F01N 3/0842
60/283
2002/0017270 A1 * 2/2002 Atago ................... F02B 17/005
123/295

(Continued)

FOREIGN PATENT DOCUMENTS

JP    2003247462 A   *  9/2003
JP    2013-124576      6/2013
(Continued)

*Primary Examiner* — Jesse S Bogue
(74) *Attorney, Agent, or Firm* — Oblon, McClelland, Maier & Neustadt, L.L.P.

(57) ABSTRACT

An exhaust purification system of an internal combustion engine includes a catalyst arranged in an exhaust passage of the internal combustion engine, a fuel supply device supplying fuel to the catalyst through the exhaust passage, and a control device configured to control the supply of fuel by the fuel supply device. The control device is configured to calculate a concentration in exhaust gas of fuel supplied to the exhaust passage by the fuel supply device and a saturation vapor pressure concentration of the fuel and supply fuel from the fuel supply device to the catalyst only when the concentration in the exhaust gas is higher than the saturation vapor pressure concentration.

16 Claims, 7 Drawing Sheets

(51) Int. Cl.
*F01N 3/10* (2006.01)
*F02D 41/02* (2006.01)
*B01D 46/00* (2006.01)
*B01D 53/94* (2006.01)
*F01N 3/025* (2006.01)
*F01N 3/035* (2006.01)
*F01N 9/00* (2006.01)
*F02B 37/02* (2006.01)
*F02D 41/38* (2006.01)

(52) U.S. Cl.
CPC ..... *B01D 53/9431* (2013.01); *B01D 53/9495* (2013.01); *F01N 3/0253* (2013.01); *F01N 3/035* (2013.01); *F01N 3/103* (2013.01); *F01N 9/002* (2013.01); *F02B 37/02* (2013.01); *F02D 41/027* (2013.01); *F02D 41/029* (2013.01); *F02D 41/1459* (2013.01); *F02D 41/38* (2013.01); *B01D 2279/30* (2013.01); *F01N 2610/04* (2013.01); *F01N 2610/146* (2013.01); *F01N 2900/1402* (2013.01); *F01N 2900/1818* (2013.01); *F02D 2041/389* (2013.01)

(58) Field of Classification Search
CPC .. F02B 37/02; F02D 2041/389; F02D 41/027; F02D 41/029; F02D 41/1459; F02D 41/38

See application file for complete search history.

(56) References Cited

U.S. PATENT DOCUMENTS

| | | | |
|---|---|---|---|
| 2003/0182936 A1* | 10/2003 | Kitahara | ................ F01N 3/023 60/295 |
| 2015/0292425 A1* | 10/2015 | Nagaoka | ............ F02D 41/0235 60/274 |
| 2018/0179934 A1 | 6/2018 | Yamamoto et al. | |
| 2018/0179937 A1 | 6/2018 | Yamamoto et al. | |

FOREIGN PATENT DOCUMENTS

| | | |
|---|---|---|
| JP | 2016-148259 | 8/2016 |
| JP | 2017-89433 | 5/2017 |
| JP | 2018-105257 | 7/2018 |
| JP | 2018-132042 | 8/2018 |

* cited by examiner

EXHAUST PURIFICATION SYSTEM OF INTERNAL COMBUSTION ENGINE

FIELD

The present invention relates to an exhaust purification system of an internal combustion engine.

BACKGROUND

Known in the past has been an internal combustion engine in which a filter for trapping particulate matter (PM) contained in exhaust gas is provided in an exhaust passage so as to purify the exhaust gas exhausted from combustion chambers. In such an internal combustion engine, in a catalyst provided at an upstream side of the filter, an oxidation reaction of the fuel is caused and the heat of reaction caused by the oxidation reaction is used to burn off the PM deposited on the filter as processing for regenerating the filter.

However, filter regeneration processing can only be performed when the internal combustion engine is in a predetermined operating state. For this reason, in the internal combustion engine described in PTL 1, to avoid the filter being clogged by PM while filter regeneration processing cannot be performed, a liquid substance such as condensed water is supplied to the PM on the filter.

CITATION LIST

Patent Literature

[PTL 1] Japanese Unexamined Patent Publication No. 2013-124576

SUMMARY

Technical Problem

However, PTL 1 does not allude at all to PM depositing on the catalyst. The inventors of the present application engaged in in-depth research and as a result discovered that PM also deposits on the catalyst. This phenomenon is believed to be based on the mechanism explained below.

For example, in filter regeneration processing, fuel is supplied to the catalyst so as to cause an oxidation reaction on the catalyst. However, it is hard for an oxidation reaction to occur at the upstream side end face of the catalyst, so the rise in temperature due to the heat of oxidation reaction is small. For this reason, the heavy fraction of fuel remains at the upstream side end face of the catalyst. The remaining heavy fraction of fuel is exposed to the exhaust gas and thereby oxidatively polymerized to change to a high viscosity component. As a result, PM deposits on the upstream side end face of the catalyst through the fuel. If the filter regeneration processing is repeated and the amount of deposition of PM on the catalyst becomes greater, the catalyst will become clogged due to the PM and the catalyst will decline in function.

Further, even if filter regeneration processing is not performed, sometimes fuel is supplied to the catalyst. For example, injected fuel is supplied to the catalyst if periodically injecting fuel from an exhaust fuel injector so as to prevent a nozzle hole of the exhaust fuel injector injecting fuel into the exhaust passage of the internal combustion engine from being clogged by soot etc. Further, if the catalyst is an NOx storage reducing catalyst (NSR catalyst), fuel is supplied as a reducing agent so as to purify by reduction the NOx stored in the catalyst. In these cases as well, due to a similar principle, PM deposits on the catalyst through the fuel.

Therefore, an object of the present invention is to provide an exhaust purification system of an internal combustion engine able to suppress clogging of the catalyst by PM.

Solution to Problem

The summary of the present disclosure is as follows.

(1) An exhaust purification system of an internal combustion engine comprising: a catalyst arranged in an exhaust passage of the internal combustion engine; a fuel supply device supplying fuel to the catalyst through the exhaust passage; and a control device configured to control the supply of fuel by the fuel supply device, wherein the control device is configured to calculate a concentration in exhaust gas of fuel supplied to the exhaust passage by the fuel supply device and a saturation vapor pressure concentration of the fuel and supply fuel from the fuel supply device to the catalyst only if the concentration in the exhaust gas is higher than the saturation vapor pressure concentration.

(2) The exhaust purification system of an internal combustion engine described in above (1), if the concentration in the exhaust gas is higher than the saturation vapor pressure concentration, the control device is configured to divide a total demanded amount of liquid phase fuel to be supplied to the catalyst by a flow rate of liquid phase fuel to be supplied to the catalyst to calculate a fuel supply time and supply fuel from the fuel supply device to the catalyst for exactly the fuel supply time.

(3) The exhaust purification system of an internal combustion engine described in above (1) or (2), wherein the fuel supply device includes an exhaust fuel injector injecting fuel into the exhaust passage at an upstream side of the catalyst in a direction of exhaust flow and an in-cylinder fuel injector injecting fuel to an inside of a cylinder, and the control device is configured to supply fuel to the catalyst from both of the exhaust fuel injector and the in-cylinder fuel injector so that the concentration in the exhaust gas becomes higher than the saturation vapor pressure concentration.

(4) The exhaust purification system of an internal combustion engine described in any one of above (1) to (3), wherein the fuel supply device includes an in-cylinder fuel injector injecting fuel into a cylinder, and the control device is configured to calculate the saturation vapor pressure concentration while considering lightening of the fuel injected from the in-cylinder fuel injector.

(5) The exhaust purification system of an internal combustion engine described in any one of above (1) to (4), wherein a turbine is arranged between the fuel supply device and the catalyst, and the control device is configured to calculate the concentration in the exhaust gas while considering dispersion of fuel by the turbine.

Advantageous Effects of Invention

According to the present invention, there is provided an exhaust purification system of an internal combustion engine able to suppress clogging of the catalyst by PM.

DESCRIPTION OF EMBODIMENTS

Figure 1:
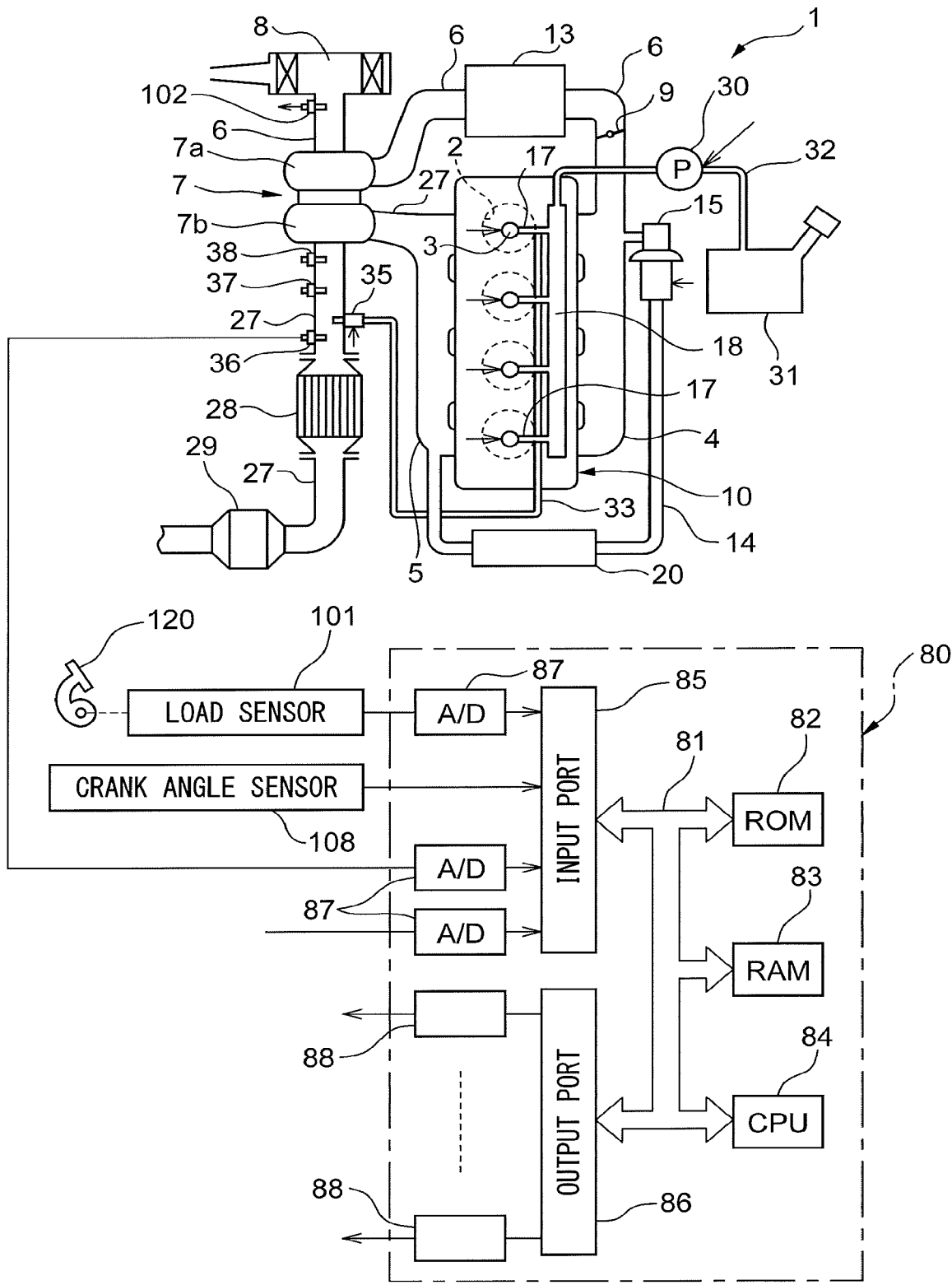
FIG. 1 is a view schematically showing an internal combustion engine in which an exhaust purification system of an internal combustion engine according to a first embodiment of the present invention is provided.
Figure 2:
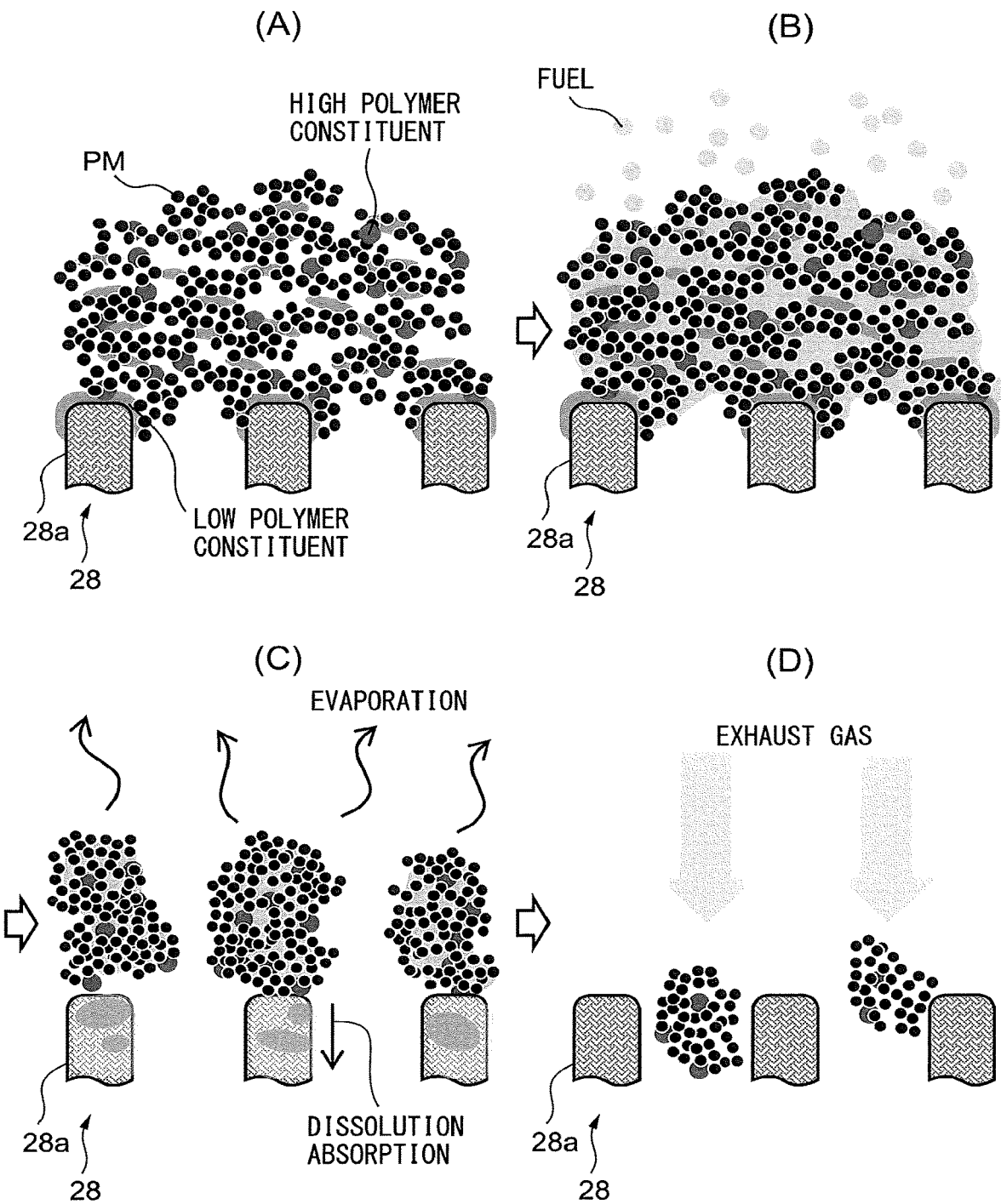
FIG. 2 is a view for explaining a mechanism by which PM is removed from a catalyst by supply of liquid phase fuel.

Below, referring to the drawings, embodiments of the present invention will be explained in detail. Note that, in the following explanation, similar component elements will be assigned the same reference numerals.

First Embodiment

Below, referring to FIG. 1 to FIG. 6, a first embodiment of the present invention will be explained.

Explanation of Internal Combustion Engine as a Whole

FIG. 1 is a view schematically showing an internal combustion engine in which an exhaust purification system of an internal combustion engine according to the first embodiment of the present invention is provided. The internal combustion engine 1 shown in FIG. 1 is a compression ignition type internal combustion engine (diesel engine). The internal combustion engine 1 is mounted in a vehicle.

Referring to FIG. 1, 10 indicates an engine body, 2 a combustion chamber of a cylinder, 3 an electronic control type cylinder fuel injector injecting fuel into the combustion chamber 2, 4 an intake manifold, and 5 an exhaust manifold. The intake manifold 4 is connected through an intake pipe 6 to an outlet of a compressor 7a of a turbocharger 7. An inlet of the compressor 7a is connected through the intake pipe 6 to an air cleaner 8. Inside the intake pipe 6, a throttle valve 9 is arranged. Further, around the intake pipe 6, an intercooler 13 is arranged so as to cool intake air flowing through the inside of the intake pipe 6. In the internal combustion engine 1, the engine cooling water is guided to the inside of the intercooler 13 where the engine cooling water is used to cool the intake air. The intake manifold 4 and intake pipe 6 form an intake passage for guiding air to the combustion chambers 2.

On the other hand, the exhaust manifold 5 is connected through an exhaust pipe 27 to an inlet of a turbine 7b of the turbocharger 7. The outlet of the turbine 7b is connected through the exhaust pipe 27 to a catalyst 28. The catalyst 28 is connected through the exhaust pipe 27 to a filter 29. The exhaust manifold 5 and exhaust pipe 27 form an exhaust passage for discharging exhaust gas produced by combustion of an air-fuel mixture in the combustion chambers 2.

The catalyst 28 is an oxidation catalyst (DOC) able to oxidize unburned fuel in the exhaust gas. The catalyst 28 is arranged in the exhaust passage at the upstream side from the filter 29 in the direction of exhaust flow. Specifically, the catalyst 28 is arranged in the exhaust passage of the internal combustion engine 1 between the turbine 7b and the filter 29 in the exhaust pipe 27. The filter 29 traps the particulate matter (PM) contained in the exhaust gas. The filter 29 is for example a diesel particulate filter (DPF).

The exhaust manifold 5 and the intake manifold 4 are connected with each other through an exhaust gas recirculation (EGR) passage 14. Inside the EGR passage 14, an electronically controlled EGR control valve 15 is arranged. Further, around the EGR passage 14, an EGR cooling device 20 for cooling the EGR gas flowing through the inside of the EGR passage 14 is arranged. In the internal combustion engine 1, engine cooling water is guided into the EGR cooling device 20 where the engine cooling water is used to cool the EGR gas.

The fuel is fed by a fuel pump 30 from a fuel tank 31 through a fuel feed pipe 32 to the inside of a common rail 18. The fuel pump 30 pumps up the fuel inside the fuel tank 31 and raises the pressure of the fuel. The high pressure fuel fed into the common rail 18 is fed through the fuel feed lines 17 to the cylinder fuel injectors 3. Each cylinder fuel injector 3 injects fuel into the cylinder. The fuel is for example diesel fuel.

Further, each cylinder fuel injector 3 is connected to a leak fuel pipe 33. Among the fuel fed from the common rail 18 to the individual cylinder fuel injectors 3, the fuel not injected into the cylinder is supplied through the leak fuel pipe 33 to the exhaust fuel injector 35.

The exhaust fuel injector 35 is arranged in the exhaust passage at the upstream side of the catalyst 28 in the direction of exhaust flow. Specifically, the exhaust fuel injector 35 is fastened to the exhaust pipe 27 between the turbine 7b and catalyst 28 in the exhaust passage of the internal combustion engine 1. The exhaust fuel injector 35 is, for example, an electronically controlled injector similar to the cylinder fuel injectors 3. The exhaust fuel injector 35 injects fuel into the exhaust passage at the upstream side of the catalyst 28 in the direction of exhaust flow and feeds the fuel through the exhaust passage to the catalyst 28.

The various control routines of the internal combustion engine 1 are performed by an electronic control unit (ECU) 80. The outputs of various sensors provided at the internal combustion engine 1 or vehicle in which the internal combustion engine 1 is mounted are input into the ECU 80. The ECU 80 controls the various actuators of the internal combustion engine 1 based on the outputs of the various sensors etc.

The ECU 80 is comprised of a digital computer provided with components connected with each other by a bidirectional bus 81 such as a ROM (read only memory) 82, RAM (random access memory) 83, CPU (microprocessor) 84, input port 85, and output port 86. Note that, in the present embodiment, a single ECU 80 is provided, but a plurality of ECUs may be provided for the individual functions.

In the present embodiment, the outputs of a load sensor 101 and an air flow meter 102 are input through corresponding AD converters 87 to the input port 85. The load sensor 101 generates an output voltage proportional to the amount of depression of the accelerator pedal 120. Therefore, the load sensor 101 detects the engine load. The air flow meter 102 is arranged in the intake passage between the air cleaner 8 and the compressor 7a and detects the amount of intake air. Further, the input port 85 is connected to a crank angle sensor 108 generating an output pulse every time a crankshaft rotates by for example 15°. The crank angle sensor 108 detects the engine speed.

On the other hand, the output port 86 is connected through corresponding drive circuits 88 to the cylinder fuel injectors 3, motor for driving throttle valve, EGR control valve 15, fuel pump 30, and exhaust fuel injector 35. The ECU 80 controls an injection timing and injection time of fuel injected from a cylinder fuel injector 3, an opening degree of the throttle valve 9, an opening degree of the EGR control valve 15, an operation of the fuel pump 30, and an injection timing and injection time of fuel injected from the exhaust fuel injector 35.

Note that, the internal combustion engine in which the exhaust purification system is provided may be a spark ignition type internal combustion engine (for example, gasoline engine) in which spark plugs are arranged at the combustion chambers. Further, the specific configuration of the internal combustion engine such as the cylinder array, configuration of the intake and exhaust systems, and presence of any turbocharger may differ from the configuration shown in FIG. 1.

For example, the fuel fed to the cylinder fuel injector 3 may be fed to the common rail 18 by an in-tank pump arranged inside the fuel tank 31 instead of by the fuel pump 30. Further, the fuel fed to the exhaust fuel injector 35 may be fed through a fuel pipe directly connecting the fuel tank 31 to the exhaust fuel injector 35 without going through the fuel pipe 32 and leak fuel pipe 33. In this case, the leak fuel pipe 33 is omitted. Further, the fuel fed to the exhaust fuel injector 35 may be stored in a separate fuel tank from the fuel tank 31. The fuel is for example diesel fuel.

<Configuration of Exhaust Purification System of Internal Combustion Engine>

Below, the configuration of an exhaust purification system of the internal combustion engine 1 (below, simply referred to as the "exhaust purification system") according to the first embodiment of the present invention will be explained. The exhaust purification system of the internal combustion engine 1 is provided with a filter 29, catalyst 28, fuel feed device feeding fuel through the exhaust passage to the catalyst 28, and control device controlling the feed of fuel by the fuel feed device. In the present embodiment, the exhaust fuel injector 35 corresponds to the fuel feed device, and the ECU 80 corresponds to the control device.

<Deposition of PM on Catalyst>

In an exhaust purification system, the PM in the exhaust gas is trapped by the filter 29 whereby the exhaust gas is purified. However, if the amount of the PM trapped by the filter 29 becomes greater, the filter 29 will clog and discharge of the exhaust gas through the filter 29 will be prevented. For this reason, PM trapped by the filter 29 has to be periodically removed.

In the present embodiment, to remove the PM trapped by the filter 29, the control device of the exhaust purification system performs processing for filter regeneration. In processing for filter regeneration, the fuel feed device feeds fuel to the catalyst 28 to thereby burn off the PM trapped by the filter 29. If feeding fuel to the catalyst 28, an oxidation reaction of the fuel occurs on the catalyst 28 and the temperature of the exhaust gas flowing into the filter 29 rises due to the heat of reaction. As a result, the temperature of the filter 29 rises and the PM trapped by the filter 29 is burned off.

However, if processing for filter regeneration is performed, the PM trapped by the filter 29 is removed, but PM deposits on the catalyst 28. This phenomenon is believed to be based on the mechanism explained below.

As explained above, in processing for filter regeneration, fuel is fed to the catalyst 28 to cause an oxidation reaction on the catalyst 28. However, at the upstream side in the direction of exhaust flow (engine body 10 side) end face of the catalyst 28 an oxidation reaction does not easily occur, so the rise in temperature due to the heat of an oxidation reaction is small. Therefore, the heavy fractions of the fuel remain on the upstream side end face of the catalyst 28. The residual heavy fractions of the fuel oxidatively polymerize due to being exposed to the exhaust gas and change to high viscosity components. As a result, PM deposits on the upstream side end face of the catalyst 28 through the fuel. If the processing for filter regeneration is repeated and the amount of deposition of PM on the catalyst 28 increases, the PM will cause the catalyst 28 to become clogged and the catalyst 28 will decline in function.

Further, even if processing for filter regeneration is not performed, sometimes fuel is fed to the catalyst 28. For example, if fuel is periodically injected from the exhaust fuel injector 35 in order to prevent the injection port of the exhaust fuel injector 35 from being clogged by soot etc., the injected fuel is fed to the catalyst 28. Further, if the catalyst 28 is an NOx storage and reduction catalyst (NSR catalyst), to remove the NOx stored in the catalyst 28 by reduction, fuel is fed as a reducing agent from the exhaust fuel injector 35 to the catalyst 28. In these cases as well, PM deposits on the catalyst 28 through the fuel by a similar principle.

<Removal of PM on Catalyst>

For this reason, in the present embodiment, the control device of the exhaust purification system feeds liquid phase fuel from the fuel feed device to the catalyst 28 to remove PM deposited on the catalyst 28. Below, the mechanism by which PM deposited on the catalyst 28 is removed by feeding liquid phase fuel to the catalyst 28 will be explained.

FIGS. 2A to 2D are views for explaining the mechanism by which PM is removed from the catalyst 28 due to the feed of liquid phase fuel. As shown in FIG. 2A, the heavy fractions of the fuel fed to the catalyst 28 change to a high viscosity high polymerized fraction and low polymerized fraction due to oxidative polymerization, and cause the PM in the exhaust gas to deposit on a base 28a of the catalyst 28. After that, as shown in FIG. 2B, the liquid phase fuel is fed to the catalyst 28. If liquid phase fuel is fed to the catalyst 28, the soluble organic fraction (SOF) in the PM dissolves in the fuel. As shown in FIG. 2C, the fuel in which the SOF is dissolved is absorbed at the base 28a of the catalyst 28 and evaporates due to the heat. Further, when the fuel in which the SOF is dissolved is absorbed in the base 28a of the catalyst 28, the liquid cross-linking force causes the PM to aggregate. The aggregated PM falls in adhesion with the base 28a. For this reason, after that, as shown in FIG. 2D, the aggregated PM is peeled off from the base 28a by the exhaust gas. Therefore, by feeding liquid phase fuel, it is possible to remove PM from the catalyst 28.

The inventors of the present application ran the following experiment so as to confirm the effect of removal of PM by supply of fuel. After supplying fuel to the catalyst so as to regenerate the filter, they exposed the catalyst to 370° C. exhaust gas for 2 hours. As a result, the clogging rate of the catalyst became 60% or more. After that, they supplied the catalyst with liquid fuel (diesel oil) in an amount of 0.06 ml/cm$^2$ per unit area of the catalyst. As a result, the clogging rate of the catalyst became 20% or less. Therefore, it was confirmed that by supplying liquid phase fuel to the catalyst, the catalyst can be kept from being clogged by PM.

In this regard, the fuel supplied by the fuel supply device to the exhaust passage is vaporized by the exhaust gas inside the exhaust passage, so it is not necessarily supplied as a liquid to the catalyst 28. For this reason, to use liquid phase fuel to remove PM from the catalyst 28, it is necessary to supply fuel at a suitable timing from the fuel supply device to the catalyst 28.

In order to supply fuel at a suitable timing from the fuel supply device to the catalyst 28, the inventors of the present application took note of the saturation vapor pressure concentration of fuel as an indicator of the amount by which fuel is vaporized. If the concentration in the exhaust gas of fuel supplied from the fuel supply device to the exhaust passage (below, referred to as the "exhaust gas fuel concentration") is equal to or less than the saturation vapor pressure concentration of fuel, all of the fuel vaporizes. On the other hand, if the exhaust gas fuel concentration is higher than the saturation vapor pressure concentration of the fuel, liquid phase fuel can be supplied to the catalyst 28.

For this reason, in the present embodiment, when removal of PM deposited on the catalyst 28 is demanded, the control device calculates the exhaust gas fuel concentration and the saturation vapor pressure concentration of the fuel and supplies fuel from the fuel supply device to the catalyst 28 only if the exhaust gas fuel concentration is higher than the saturation vapor pressure concentration. In other words, at the time of a demand for removal of PM, the control device supplies fuel from the fuel supply device to the catalyst 28 if the exhaust gas fuel concentration is higher than the saturation vapor pressure concentration of the fuel and does not supply fuel from the fuel supply device to the catalyst 28 if the exhaust gas fuel concentration is equal to or less than the saturation vapor pressure concentration of the fuel.

By doing this, at the time of a demand for removal of PM, it is possible to reliably supply the catalyst 28 with liquid phase fuel and in turn possible to suppress clogging of the catalyst 28 by PM. Further, it is possible to keep fuel from being supplied from the fuel supply device to the catalyst 28 at a timing when liquid phase fuel cannot be supplied to the catalyst 28 and in turn possible to keep the fuel efficiency of the internal combustion engine 1 from deteriorating.

<Processing for Removal of PM>

Figure 3:
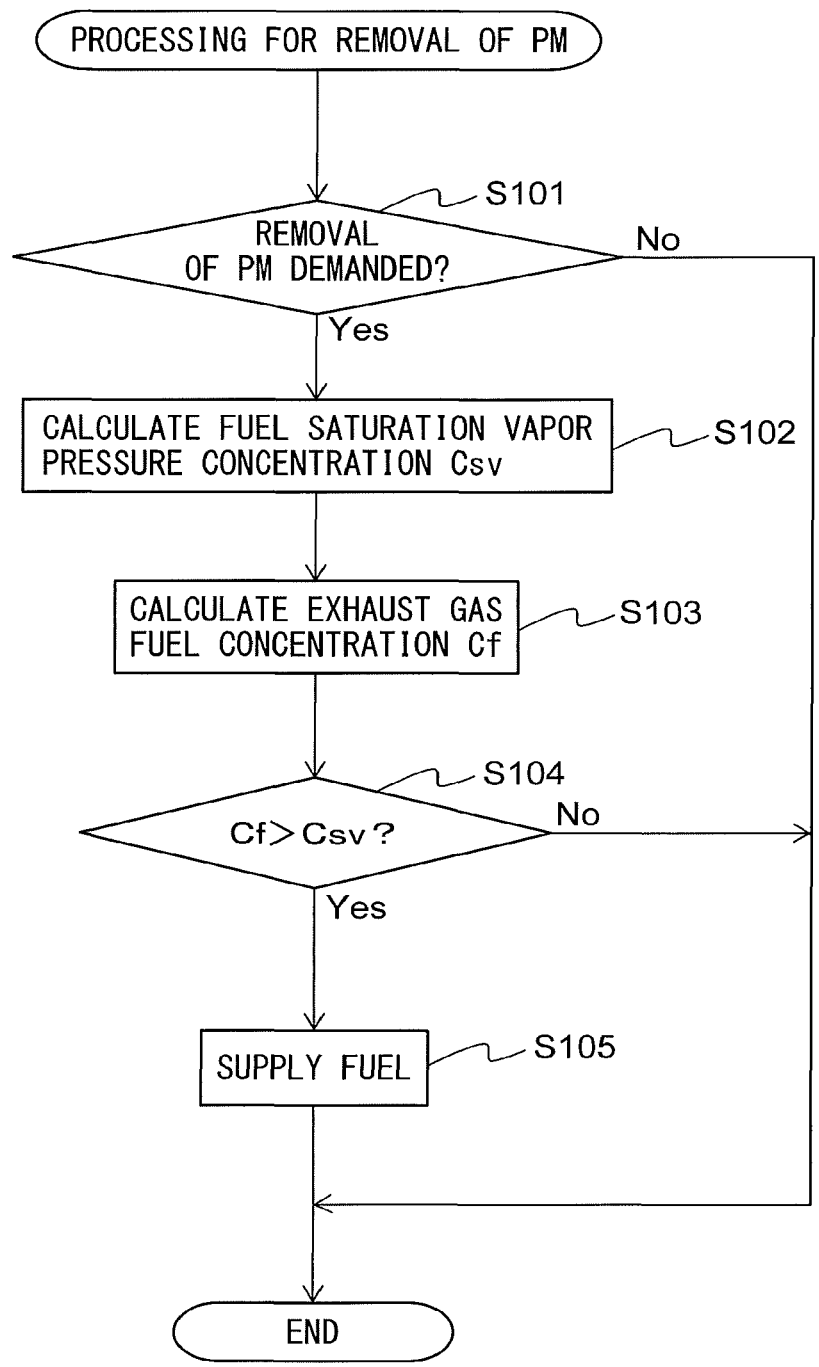
FIG. 3 is a flow chart showing a control routine of processing for removal of PM in the first embodiment of the present invention.

Below, referring to the flow chart, the above-mentioned control will be explained in detail. FIG. 3 is a flow chart showing a control routine of processing for removal of PM in a first embodiment of the present invention. The present control routine is repeatedly performed by a control device of the exhaust purification system (in the present embodiment, the ECU 80).

First, at step S101, the control device judges whether there is a demand for removal of PM deposited on the catalyst 28. For example, the control device judges that there is a demand for removal of PM if judging that the total amount of PM deposited on the catalyst 28 is equal to or more than a predetermined value. The predetermined value is determined in advance and, for example, is set to an amount of PM corresponding to a 50% to 80% clogging rate of the catalyst 28.

Figure 4:
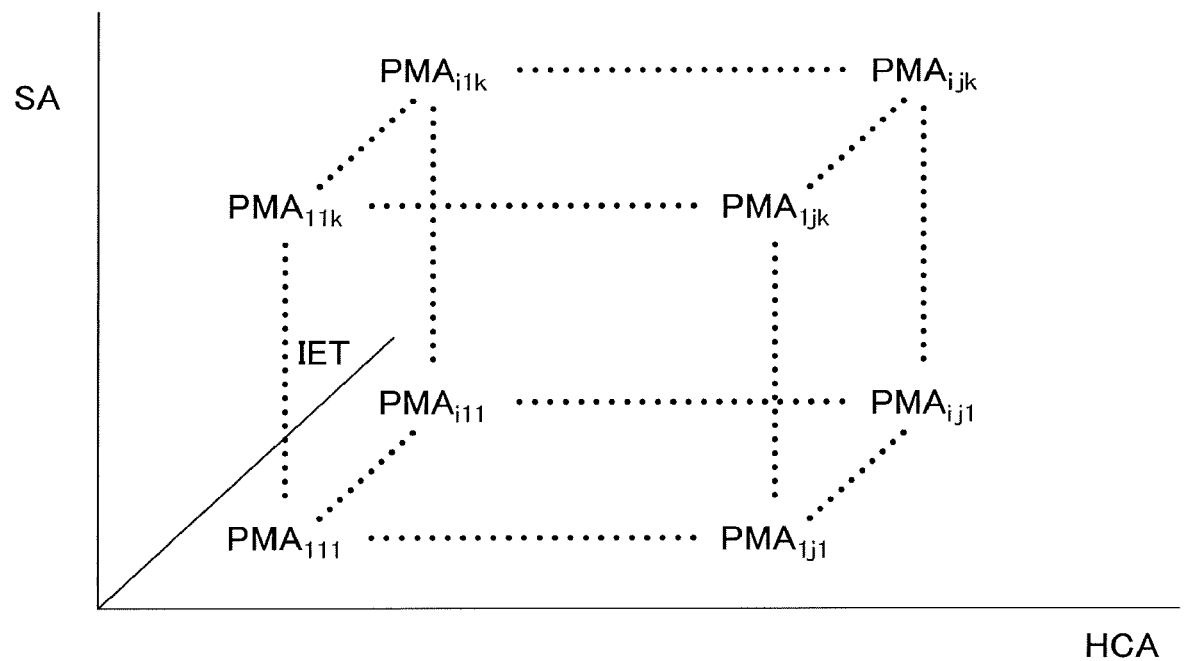
FIG. 4 is a map for calculating an amount of increase of PM.

The control device cumulatively adds the amounts of change of the amount of PM deposited on the catalyst 28 to calculate the total amount of PM. If the gaseous phase fuel (unburned fuel) supplied to the catalyst 28 is exposed to high temperature (200 to 450° C.) exhaust gas, the heavy fraction of the fuel will change to a high viscosity constituent and soot supplied to the catalyst 28 will deposit on the catalyst 28 through the fuel. For this reason, the control device uses a map or calculation formula to calculate the amount of increase of PM based on the amount of soot supplied to the catalyst 28, the amount of gaseous phase fuel supplied to the catalyst 28, and the temperature of the exhaust gas flowing into the catalyst 28 (below, referred to as the "inflowing exhaust gas"). If a map is used, as shown in FIG. 4, the amount of increase PMA of the PM is shown as a function of the amount of soot SA supplied to the catalyst 28, the amount of gaseous phase fuel HCA supplied to the catalyst 28, and the temperature IET of the inflowing exhaust gas.

At this time, the control device uses a map or calculation formula to calculate the amount of soot and amount of gaseous phase fuel by a known method based on predetermined operating parameters of the internal combustion engine 1 (fuel injection amount and fuel injection timing of in-cylinder fuel injector 3, engine speed, amount of EGR gas, etc.). Further, the control device uses an exhaust temperature sensor 36 to detect the temperature of the inflowing exhaust gas. The exhaust temperature sensor 36 is arranged in the exhaust passage at the upstream side of the catalyst 28 in the direction of exhaust flow, specifically, is arranged between the turbine 7b and the catalyst 28 in the exhaust pipe 27. The exhaust temperature sensor 36 detects the temperature of the inflowing exhaust gas. The output of the exhaust temperature sensor 36 is input through a corresponding AD converter 87 to the input port 85 of the ECU 80.

Note that, the control device may use a map or calculation formula to calculate the temperature of the inflowing exhaust gas by a known method based on predetermined operating parameters of the internal combustion engine 1 (fuel injection amount of in-cylinder fuel injector 3, engine speed, etc.). In this case, the exhaust temperature sensor 36 may be omitted from the internal combustion engine 1.

As explained above, if liquid phase fuel is supplied to the catalyst 28, the PM deposited on the catalyst 28 is removed. For this reason, when liquid phase fuel is supplied to the catalyst 28, the control device calculates the amount of reduction of PM based on the amount of liquid phase fuel reaching the catalyst 28. Further, if the temperature of the inflowing exhaust gas is equal to or higher than the combustion temperature of PM (for example, 500° C.), PM deposited on the catalyst 28 is burned off. For this reason, when the temperature of the inflowing exhaust gas is equal to or higher than the combustion temperature of PM, the control device calculates the amount of reduction of PM based on the temperature of the inflowing exhaust gas.

Further, if the total amount of PM becomes greater, the exhaust pressure at the upstream side of the catalyst 28 becomes higher. For this reason, the control device may judge that the total amount of the PM is equal to or more than the predetermined value if the exhaust pressure at the upstream side of the catalyst 28 is equal to or higher than a predetermined value. In this case, the control device uses an exhaust pressure sensor 37 to detect the exhaust pressure. The exhaust pressure sensor 37 is arranged at the upstream side of the catalyst 28 in the direction of exhaust flow in the exhaust passage, specifically, is arranged between the turbine 7b and the catalyst 28 in the exhaust pipe 27. The exhaust pressure sensor 37 detects the exhaust pressure. The output of the exhaust pressure sensor 37 is input through the corresponding AD converter 87 to the input port 85 of the ECU 80.

Note that, the control device may use a map or calculation formula to calculate the exhaust pressure by a known method based on predetermined operating parameters of the internal combustion engine 1 (fuel injection amount and fuel injection timing of in-cylinder fuel injector 3, engine speed, amount of intake air, etc.). In this case, the exhaust pressure sensor 37 may be omitted from the internal combustion engine 1.

As explained above, if the total amount of PM becomes greater, the exhaust pressure at the upstream side of the catalyst 28 becomes higher. As a result, the amount of the exhaust gas remaining in the cylinders becomes greater and the efficiency of filling the cylinders falls. For this reason, the control device may judge that the total amount of PM is equal to or more than the predetermined value if the ratio of the current filling efficiency to the initial state filling efficiency (current filling efficiency/initial state filling efficiency) is equal to or less than a predetermined value less than 1. The initial state filling efficiency and the current filling efficiency are calculated by for example dividing the amount of intake air by the intake air pressure (amount of intake air/intake air pressure) when the amount of EGR gas is zero and the internal combustion engine 1 is in a predetermined operating state (for example, decelerating state, idling state, etc.). The amount of intake air is detected by an air flow meter 102, while the intake air pressure is, for example, detected by an intake pressure sensor detecting the pressure inside the intake passage (intake manifold 4 or intake pipe 6). Further, the initial state filling efficiency is calculated before PM deposits on the catalyst 28. Note that, the initial state filling efficiency may be a value determined in advance.

Further, the control device may judge that the total amount of PM is equal to or more than the predetermined value if the pressure difference before and after the catalyst 28 detected by a differential pressure sensor is equal to or higher than a predetermined value. Further, the control device may judge that the total amount of PM is equal to or more than the predetermined value if fuel is supplied from the fuel supply device to the catalyst 28 for purposes other than removal of PM and a predetermined time elapses from the supply of fuel.

If at step S101 it is judged that there is no demand for removal of PM, the present control routine ends. On the other hand, if at step S101 it is judged that there is a demand for removal of PM, the present control routine proceeds to step S102.

Figure 5:
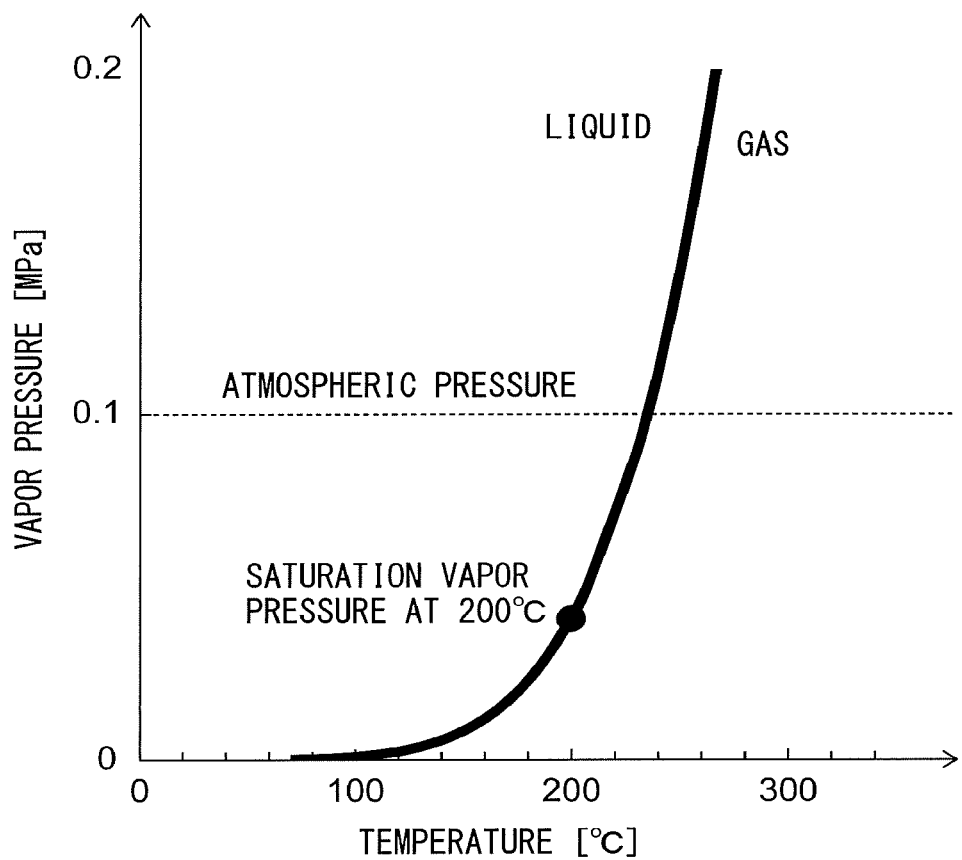
FIG. 5 shows a saturation vapor pressure curve of C13 tolydecane ($C_{13}H_{28}$).

At step S102, the control device calculates the fuel saturation vapor pressure concentration Csv. Fuel contains a plurality of constituents. The saturation vapor pressure curve differs with each constituent. For example, diesel oil contains alkanes with about 10 to 16 carbon atoms as its main constituent. FIG. 5 shows the saturation vapor pressure curve of C13 tridecane ($C_{13}H_{28}$).

Figure 6:
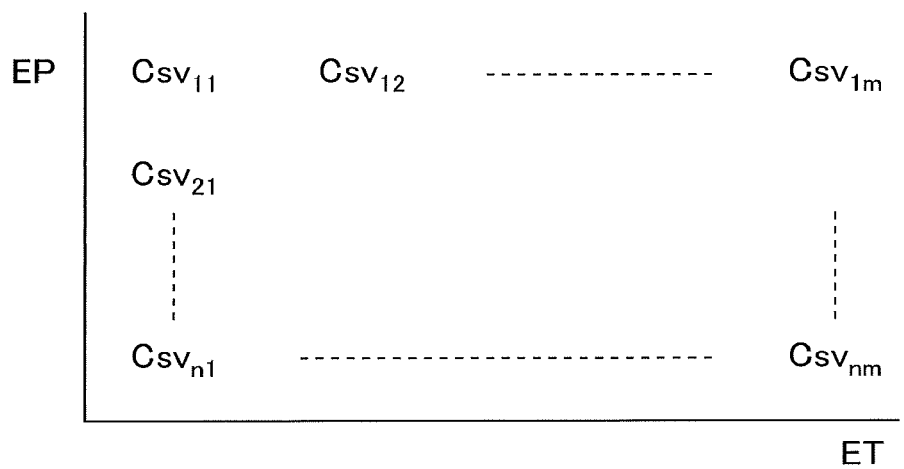
FIG. 6 is a map for calculating a saturation vapor pressure concentration.

The saturation vapor pressure concentration of a predetermined substance in an exhaust passage is calculated by dividing the saturation vapor pressure by the exhaust pressure (saturation vapor pressure concentration=saturation vapor pressure/exhaust pressure). Further, as will be understood from FIG. 5, the saturation vapor pressure is correlated with the exhaust temperature. For this reason, the control device uses a map or calculation formula to calculate the fuel saturation vapor pressure concentration Csv based on the exhaust pressure and the exhaust temperature. If a map is used, as shown in FIG. 6, the saturation vapor pressure concentration Csv is shown as a function of the exhaust pressure EP and the exhaust temperature ET.

The map or calculation formula is prepared based on for example the saturation vapor pressure curve of a constituent having an average boiling point in the main constituents of the fuel. Note that, the map or calculation formula may be prepared based on the average content of the main constituents of the fuel and the saturation vapor pressure curve.

The control device uses an exhaust temperature sensor 36 to detect an exhaust temperature. Note that, the control device may use a map or calculation formula to calculate the exhaust temperature by a known method based on predetermined operating parameters of the internal combustion engine 1 (fuel injection amount of in-cylinder fuel injector 3, engine speed, etc.). In this case, the exhaust temperature sensor 36 may be omitted from the internal combustion engine 1.

Further, the control device uses an exhaust pressure sensor 37 to detect the exhaust pressure. Note that, the control device may use a map or calculation formula to calculate the exhaust pressure by a known method based on predetermined operating parameters of internal combustion engine 1 (fuel injection amount and fuel injection timing of in-cylinder fuel injector 3, engine speed, amount of intake air, etc.). Further, the control device may calculate the fuel saturation vapor pressure concentration Csv while deeming the exhaust pressure to be a constant pressure (for example, atmospheric pressure). In these cases, the exhaust pressure sensor 37 may be omitted from the internal combustion engine 1.

Next, at step S103, the control device calculates the exhaust gas fuel concentration Cf. Specifically, the control device divides the maximum fuel injection rate of the exhaust fuel injector 35 by the exhaust flow rate to thereby calculate the exhaust gas fuel concentration Cf (exhaust gas fuel concentration Cf=maximum fuel injection rate (g/s) of exhaust fuel injector 35/exhaust flow rate (g/s)). The maximum fuel injection rate of the exhaust fuel injector 35 is determined in advance. The greater the exhaust flow rate, the more the concentration of fuel per unit space falls, so the exhaust gas fuel concentration falls.

The control device uses a flow rate sensor 38 to detect the exhaust flow rate. The flow rate sensor 38 is arranged in the exhaust passage at the upstream side of the catalyst 28 in the direction of exhaust flow, specifically, is arranged between the turbine 7b and the catalyst 28 inside the exhaust pipe 27. The flow rate sensor 38 detects the exhaust flow rate. The output of the flow rate sensor 38 is input through a corresponding AD converter 87 to the input port 85 of the ECU 80.

Note that, the control device may use a map or calculation formula to calculate the exhaust flow rate by a known method based on predetermined operating parameters of the internal combustion engine 1 (fuel injection amount of in-cylinder fuel injector 3, engine speed, amount of intake air, etc.). In this case, the flow rate sensor 38 may be omitted from the internal combustion engine 1.

Next, at step S104, the control device judges whether the exhaust gas fuel concentration Cf is higher than the fuel saturation vapor pressure concentration Csv. If it is judged that the exhaust gas fuel concentration Cf is equal to or less than the fuel saturation vapor pressure concentration Csv, the catalyst 28 cannot be supplied with liquid phase fuel, so the present control routine ends. On the other hand, if it is judged that the exhaust gas fuel concentration Cf is higher than the fuel saturation vapor pressure concentration Csv, the present control routine proceeds to step S105.

At step S105, the control device supplies fuel from the fuel supply device (in the present embodiment, the exhaust fuel injector 35) to the catalyst 28. For example, the control device supplies fuel from the fuel supply device to the catalyst 28 continuously or intermittently for exactly a predetermined time. After step S105, the present control routine ends.

Note that, if the engine load rapidly rises, the exhaust temperature rises and the saturation vapor pressure of the fuel rises. As a result, the fuel saturation vapor pressure concentration Csv becomes higher and the fuel more easily vaporizes. For this reason, at step S105, the control device may suspend the supply of fuel from the fuel supply device when the amount of rise of the engine load becomes equal to or more than a predetermined value.

Further, if the vehicle mounting the internal combustion engine 1 is in a decelerating state when starting the supply of fuel, the control device may suspend the supply of fuel from the fuel supply device when the decelerating state ends. Whether or not a vehicle is in the decelerating state is, for example, judged using a stroke sensor detecting the amount of depression of the brake pedal.

Further, if the internal combustion engine 1 is in an idling state when starting the supply of fuel, the control device may suspend the supply of fuel from the fuel supply device when the idling state ends. Note that, the "idling state" means the state in which the accelerator opening degree is zero and the engine speed is maintained at a predetermined idling speed (for example, 400 to 800 rpm) by combustion of the air-fuel mixture. The control device judges that the idling state ends when the engine speed becomes higher than the idling speed.

In the present embodiment, the exhaust fuel injector 35 is arranged between the turbine 7b and the catalyst 28. However, the exhaust fuel injector 35 may be arranged at the upstream side of the turbine 7b in the exhaust passage. In other words, the turbine 7b may be arranged between the exhaust fuel injector 35 and the catalyst 28. In this case, the fuel supplied from the exhaust fuel injector 35 is dispersed by the turbine 7b resulting in parts of the fuel depositing on the turbine 7b etc. or being returned to the upstream side in the direction of exhaust flow. As a result, the amount of fuel supplied from the exhaust fuel injector 35 to the catalyst 28 falls.

For this reason, if the turbine 7b is arranged between the exhaust fuel injector 35 and the catalyst 28, the control device may calculate the exhaust gas fuel concentration Cf while considering the dispersion of the fuel by the turbine 7b. By doing this, the exhaust gas fuel concentration Cf can be precisely calculated and liquid phase fuel can be more reliably supplied to the catalyst 28. For example, the control device multiplies the maximum fuel injection rate of the exhaust fuel injector 35 with a correction coefficient and divides that value by the exhaust flow rate so as to calculate the exhaust gas fuel concentration Cf (exhaust gas fuel concentration Cf=correction coefficient×maximum fuel injection rate of exhaust fuel injector 35 (g/s)/exhaust flow rate (g/s)). The correction coefficient is a value of less than 1 and is determined in advance considering the dispersion of fuel by the turbine 7b.

Further, the fuel supply device may be an in-cylinder fuel injector 3 injecting fuel inside of a cylinder. That is, as the fuel supply device, instead of the exhaust fuel injector 35, an in-cylinder fuel injector 3 may be used. An in-cylinder fuel injector 3 can perform post injection in an expansion stroke of each cylinder so as to supply unburned fuel to the catalyst 28. In this case, the exhaust fuel injector 35 may be omitted.

If the in-cylinder fuel injector 3 is used as the fuel supply device, at step S103, the exhaust gas fuel concentration Cf is calculated as follows. The control device multiplies the amount of fuel injection due to the post injection per stroke with the engine speed per second and number of injections per rotation (for example, if the number of cylinders of the internal combustion engine 1 is 4, two times) so as to calculate the fuel injection rate of the in-cylinder fuel injector 3 (fuel injection rate (g/s) of in-cylinder fuel injector 3=fuel injection amount (g/st)×engine speed (rev/s)×number of injections (st/rev)). Next, the control device divides the fuel injection rate of the in-cylinder fuel injector 3 by the exhaust flow rate to thereby calculate the exhaust gas fuel concentration Cf (exhaust gas fuel concentration Cf=fuel injection rate (g/s) of in-cylinder fuel injector 3/exhaust flow rate (g/s)).

Further, if an in-cylinder fuel injector 3 is used as the fuel supply device, due to the lightening of the fuel, the boiling point of the unburned fuel supplied to the exhaust passage becomes lower than a base boiling point determined from the fuel characteristics. As a result, the fuel more easily vaporizes.

For this reason, the control device may calculate the fuel saturation vapor pressure concentration Csv while considering the lightening of the fuel injected from the in-cylinder fuel injector 3. By doing this, it is possible to more precisely calculate the fuel saturation vapor pressure concentration Csv and possible to more reliably supply liquid phase fuel to the catalyst 28. For example, the control device multiplies the detected or calculated exhaust temperature by a correction coefficient larger than 1 to thereby correct the exhaust temperature and calculates the fuel saturation vapor pressure concentration Csv based on the corrected exhaust temperature. The correction coefficient is determined in advance while considering the lightening of fuel.

Further, if an in-cylinder fuel injector 3 is used as the fuel supply device, the turbine 7b is arranged between the in-cylinder fuel injector 3 and the catalyst 28. For this reason, the control device may calculate the exhaust gas fuel concentration Cf while considering the dispersion of the fuel by the turbine 7b. By doing this, it is possible to precisely calculate the exhaust gas fuel concentration Cf and possible to more reliably supply liquid phase fuel to the catalyst 28. For example, the control device multiplies the fuel injection rate of the in-cylinder fuel injector 3 with a correction coefficient and divides that value by the exhaust flow rate to calculate the exhaust gas fuel concentration Cf (exhaust gas fuel concentration Cf=correction coefficient×fuel injection rate (g/s) of in-cylinder fuel injector 3/exhaust flow rate (g/s)). The correction coefficient is a value of less than 1 and is determined in advance while considering the dispersion of the fuel by the turbine 7b.

Second Embodiment

The exhaust purification system of an internal combustion engine according to the second embodiment is basically similar to the exhaust purification system of an internal combustion engine according to the first embodiment except for the points explained below. For this reason, below, the second embodiment of the present invention will be explained centered on the parts different from the first embodiment.

As explained above, if the exhaust gas fuel concentration is equal to or less than the fuel saturation vapor pressure concentration, fuel is not supplied for removing PM from the catalyst 28. If fuel is supplied to the catalyst 28 from both of the in-cylinder fuel injector 3 and the exhaust fuel injector 35, compared with if fuel is supplied to the catalyst 28 from only one of the in-cylinder fuel injector 3 and the exhaust fuel injector 35, the amount of fuel supplied to the catalyst 28 will increase. As a result, the exhaust gas fuel concentration can be raised.

For this reason, in the second embodiment, as fuel supply devices, the exhaust fuel injector 35 and in-cylinder fuel injector 3 are used. The control device supplies fuel to the catalyst 28 from both of the exhaust fuel injector 35 and in-cylinder fuel injector 3 so that the exhaust gas fuel concentration becomes higher than the fuel saturation vapor pressure concentration. In this case, the exhaust gas fuel concentration is calculated as the total of the concentration in the exhaust gas of fuel supplied from the exhaust fuel injector 35 to the exhaust passage and the concentration in the exhaust gas of the fuel supplied to the exhaust passage by post injection by the in-cylinder fuel injector 3.

<Processing for Removal of PM>

Figure 7:
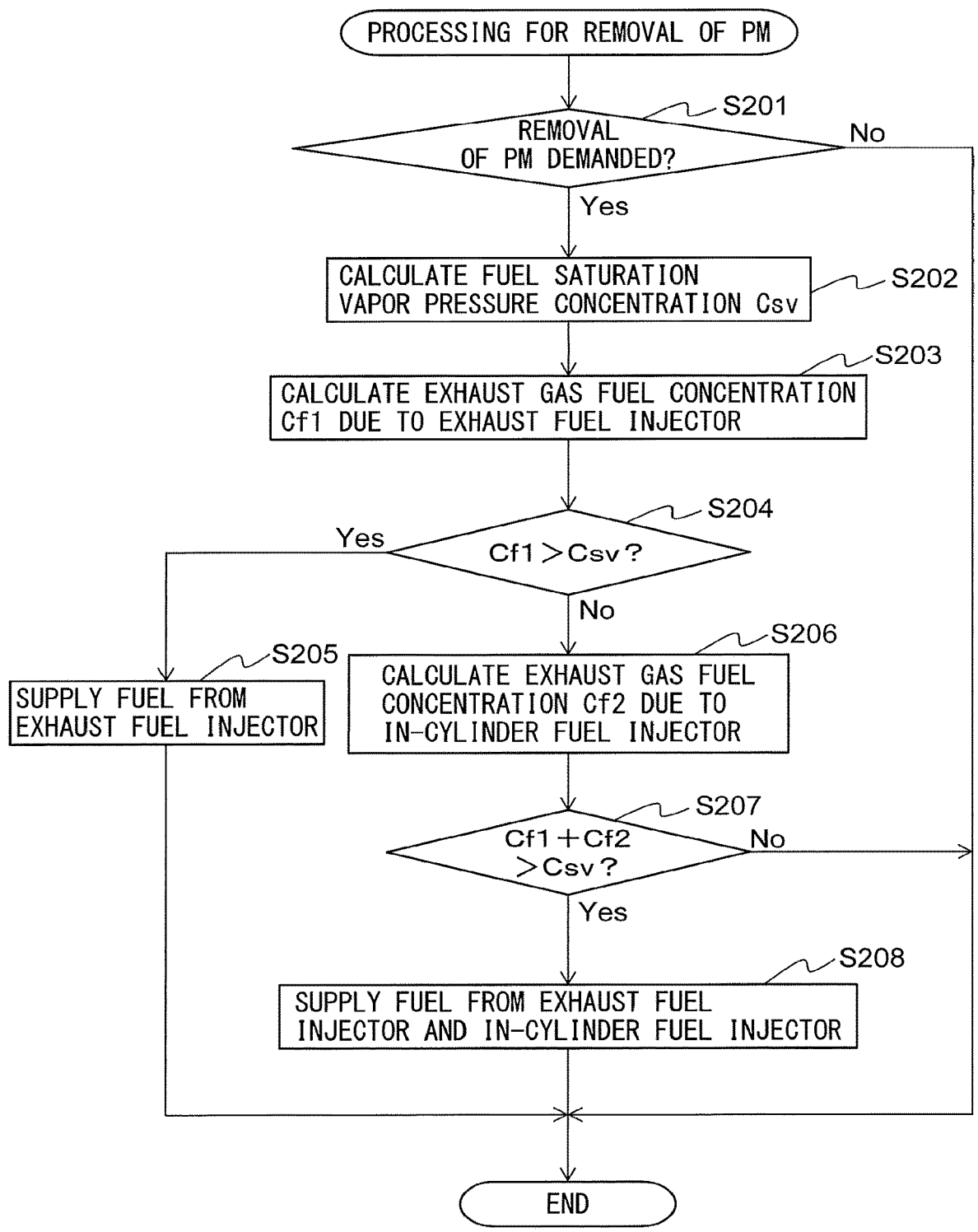
FIG. 7 is a flow chart showing a control routine of processing for removal of PM in a second embodiment of the present invention.

FIG. 7 is a flow chart showing a control routine of processing for removal of PM in the second embodiment of the present invention. The present control routine is repeatedly performed by the control device of the exhaust purification system (in the present embodiment, the ECU 80).

Step S201 and step S202 are similar to step S101 and step S102 of FIG. 3, so explanations will be omitted. After step S202, at step S203, the control device calculates the concentration Cf1 in the exhaust gas of the fuel supplied from the exhaust fuel injector 35 to the exhaust passage (below, referred to as the "exhaust gas first fuel concentration"). In the same way as step S103 of FIG. 3, the control device divides the maximum fuel injection rate of the exhaust fuel injector 35 by the exhaust flow rate to thereby calculate the exhaust gas first fuel concentration Cf1 (exhaust gas first fuel concentration Cf1=maximum fuel injection rate (g/s) of exhaust fuel injector 35/exhaust flow rate (g/s)).

Next, at step S204, the control device judges whether the exhaust gas first fuel concentration Cf1 is higher than the fuel saturation vapor pressure concentration Csv. If it is judged that the exhaust gas first fuel concentration Cf1 is higher than the fuel saturation vapor pressure concentration Csv, the present control routine proceeds to step S205.

At step S205, the control device supplies fuel from the exhaust fuel injector 35 to the catalyst 28. For example, the control device continuously or intermittently supplies fuel from the exhaust fuel injector 35 to the catalyst 28 for exactly a predetermined time. After step S205, the present control routine ends.

On the other hand, if at step S204 it is judged that the exhaust gas first fuel concentration Cf1 is equal to or less than the fuel saturation vapor pressure concentration Csv, the present control routine proceeds to step S206. At step S206, the control device calculates the concentration Cf2 in exhaust gas of the fuel supplied to the exhaust passage by post injection by the in-cylinder fuel injector 3 (below, referred to as the "exhaust gas second fuel concentration"). In the same way as the case in the first embodiment where an in-cylinder fuel injector 3 is used as the fuel supply device, the control device divides the fuel injection rate of the in-cylinder fuel injector 3 by the exhaust flow rate to calculate the exhaust gas second fuel concentration Cf2 (exhaust gas second fuel concentration Cf1=fuel injection rate (g/s) of in-cylinder fuel injector 3/exhaust flow rate (g/s)).

Next, at step S207, the control device judges whether the total of the exhaust gas first fuel concentration Cf1 and exhaust gas second fuel concentration Cf2 is higher than the fuel saturation vapor pressure concentration Csv. If it is judged that the total of the exhaust gas first fuel concentration Cf1 and exhaust gas second fuel concentration Cf2 is equal to or less than the fuel saturation vapor pressure concentration Csv, liquid phase fuel cannot be supplied to the catalyst 28, so the present control routine ends.

On the other hand, if it is judged that the total of the exhaust gas first fuel concentration Cf1 and exhaust gas second fuel concentration Cf2 is higher than the fuel saturation vapor pressure concentration Csv, the present control routine proceeds to step S208. A step S208, the control device supplies fuel from the exhaust fuel injector 35 and in-cylinder fuel injector 3 to the catalyst 28. For example, the control device continuously or intermittently supplies fuel from the exhaust fuel injector 35 and in-cylinder fuel injector 3 to the catalyst 28 for exactly a predetermined time. After step S208, the present control routine ends. Therefore, the control device supplies fuel from the exhaust fuel injector 35 and in-cylinder fuel injector 3 to the catalyst 28 if the exhaust gas first fuel concentration Cf1 is equal to or less than the fuel saturation vapor pressure concentration Csv and the total of the exhaust gas first fuel concentration Cf1 and the exhaust gas second fuel concentration Cf2 is higher than the fuel saturation vapor pressure concentration Csv.

Note that, at step S205 or step S208, the control device may suspend the supply of fuel from the fuel supply device when the amount of rise of the engine load becomes equal to or more than a predetermined value. Further, if the vehicle mounting the internal combustion engine 1 is in the decelerating state when starting to supply the fuel, the control device may suspend the supply of fuel from the fuel supply device when the decelerating state is ended. Further, if the internal combustion engine 1 is in the idling state when starting to supply the fuel, the control device may suspend the supply of fuel from the fuel supply device when the idling state is ended.

Further, if a turbine 7b is arranged between the exhaust fuel injector 35 and the catalyst 28, the control device may calculate the exhaust gas first fuel concentration Cf1 while considering the dispersion of fuel by the turbine 7b. Further, the control device may calculate the exhaust gas second fuel concentration Cf2 while considering the dispersion of fuel by the turbine 7b.

Further, if fuel is supplied to the catalyst 28 from the in-cylinder fuel injector 3 as well, the control device may calculate the fuel saturation vapor pressure concentration Csv while considering the lightening of the fuel injected from the in-cylinder fuel injector 3. In this case, for example, between step S206 and step S207, the fuel saturation vapor pressure concentration Csv is calculated while considering the lightening of the fuel injected from the in-cylinder fuel injector 3 and the calculated saturation vapor pressure concentration Csv is used at step S207.

Third Embodiment

The exhaust purification system of an internal combustion engine according to a third embodiment is basically similar to the exhaust purification system of an internal combustion engine according to the first embodiment except for the points explained below. For this reason, below, the third embodiment of the present invention will be explained centered on the parts different from the first embodiment.

The greater the amount of PM deposited on the catalyst 28, the greater the amount of liquid phase fuel required for removing the PM. For this reason, in order to remove the PM deposited on the catalyst 28 by the minimum fuel, it is desirable to make the total amount of fuel supplied from the fuel supply device to the exhaust passage change according to the total amount of liquid phase fuel demanded to be supplied to the catalyst 28. Further, it is possible to make the time during which fuel is supplied from the fuel supply device to the exhaust passage change to thereby make the total amount of fuel supplied from the fuel supply device to the exhaust passage change.

For this reason, in the third embodiment, if the exhaust gas fuel concentration is higher than the saturation vapor pressure concentration of the fuel, the control device divides the total demanded amount of liquid phase fuel supplied to the catalyst 28 by the flow rate of the liquid phase fuel supplied to the catalyst 28 to thereby calculate the fuel supply time and supplies fuel from the fuel supply device to the catalyst 28 for exactly the calculated fuel supply time. By doing this, it is possible to effectively remove PM from the catalyst 28 while keeping the fuel efficiency of the internal combustion engine 1 from deteriorating due to the removal of PM.

<Processing for Removal of PM>

Figure 8:
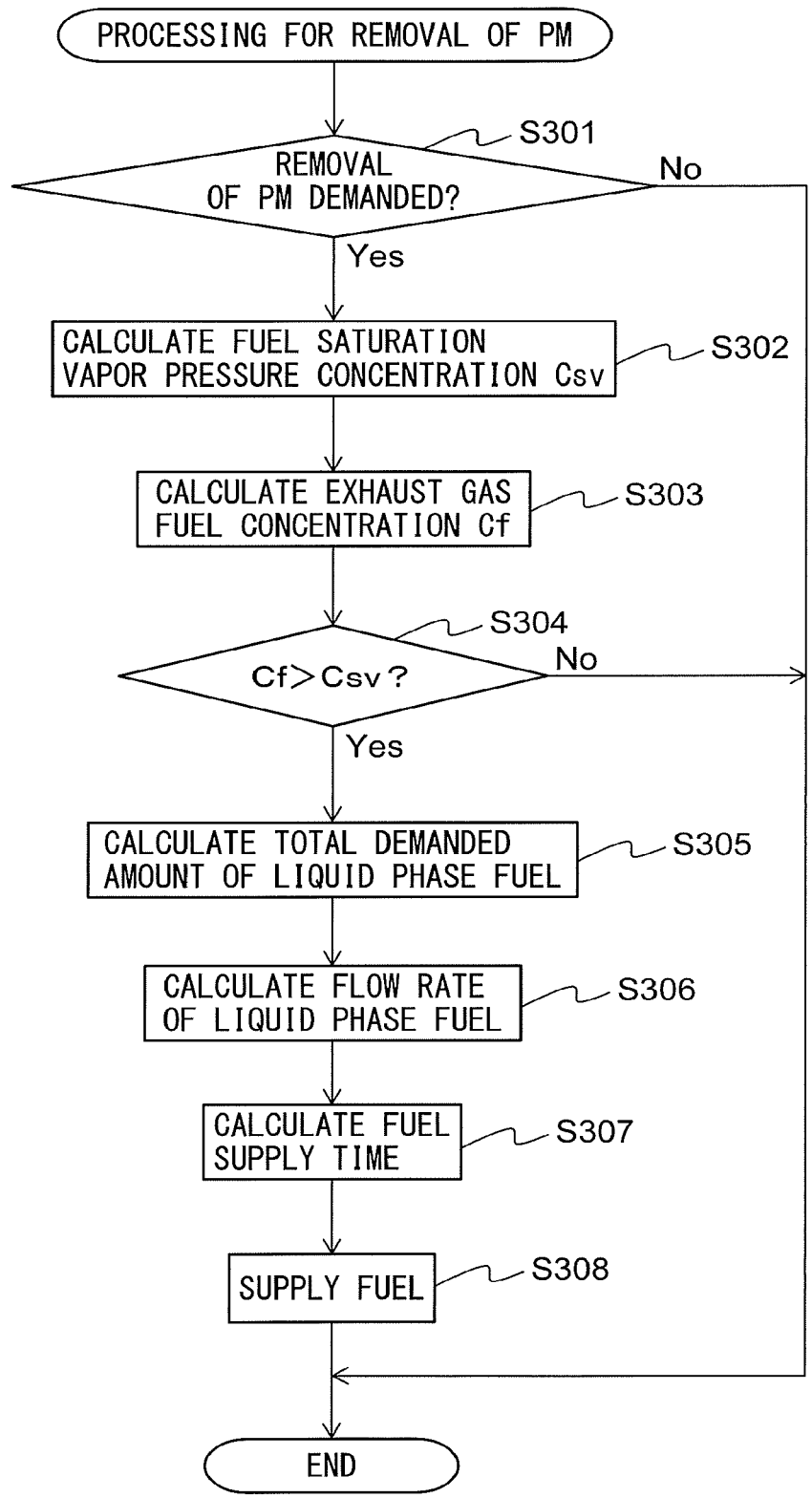
FIG. 8 is a flow chart showing a control routine of processing for removal of PM in a third embodiment of the present invention.

FIG. 8 is a flow chart showing a control routine of processing for removal of PM in the third embodiment of the present invention. The present control routine is repeatedly performed by a control device of the exhaust purification system (in the present embodiment, the ECU 80).

Step S301 to step S304 are similar to step S101 to step S104 of FIG. 3, so an explanation will be omitted. If at step S304 it is judged that the exhaust gas fuel concentration Cf is higher than the fuel saturation vapor pressure concentration Csv, the present control routine proceeds to step S305.

At step S305, the control device calculates the total demanded amount of liquid phase fuel supplied to the catalyst 28. Specifically, the control device uses a map or calculation formula to calculate the total demanded amount of liquid phase fuel supplied to the catalyst 28 based on the total amount of PM deposited on the catalyst 28. In the same way as the case where the total amount of PM is calculated at step S101 of FIG. 3, the control device cumulatively adds the amounts of change of the amounts of PM deposited on the catalyst 28 to calculate the total amount of PM. Further, the map or calculation formula is prepared so that the greater the total amount of PM, the greater the total demanded amount of liquid phase fuel.

Next, at step S306, the control device calculates the flow rate of the liquid phase fuel supplied to the catalyst 28. Specifically, the control device multiplies the exhaust flow rate with the value of the exhaust gas fuel concentration Cf minus the fuel saturation vapor pressure concentration Csv to thereby calculate the flow rate of liquid phase fuel supplied to the catalyst 28 (flow rate of liquid phase fuel (g/s)=(exhaust gas fuel concentration Cf−fuel saturation vapor pressure concentration Csv)×exhaust flow rate (g/s)).

Next, at step S307, the control device calculates the fuel supply time. Specifically, the control device divides the total demanded amount of liquid phase fuel by the flow rate of the liquid phase fuel to calculate the fuel supply time (fuel supply time (s)=total demanded amount of liquid phase fuel (g)/flow rate of liquid phase fuel (g/s)).

Next, at step S308, the control device supplies fuel from the fuel supply device (in the present embodiment, the exhaust fuel injector 35) to the catalyst 28 continuously or intermittently for exactly the calculated fuel supply time. After step S308, the present control routine ends.

Note that, at step S308, the control device may suspend the supply of fuel from the fuel supply device when the amount of rise of the engine load becomes equal to or more than a predetermined value. Further, if at the time of start of supply of fuel, the vehicle mounting the internal combustion engine 1 is in the decelerating state, the control device may suspend the supply of fuel from the fuel supply device when the decelerating state ends. Further, if at the time of start of supply of fuel, the internal combustion engine 1 is in the idling state, the control device may suspend the supply of fuel from the fuel supply device when the idling state ends.

Further, if a turbine 7b is arranged between the exhaust fuel injector 35 and the catalyst 28, the control device may calculate the exhaust gas fuel concentration Cf while considering the dispersion of fuel due to the turbine 7b.

Further, an in-cylinder fuel injector 3 may be used as the fuel supply device instead of the exhaust fuel injector 35. Further, if the in-cylinder fuel injector 3 is used as the fuel supply device, the control device may calculate the fuel saturation vapor pressure concentration Csv while considering lightening of the fuel injected from the in-cylinder fuel injector 3. Further, if an in-cylinder fuel injector 3 is used as the fuel supply device, the control device may calculate the exhaust gas fuel concentration Cf while considering the dispersion of the fuel due to the turbine 7b.

Above, preferred embodiments according to the present invention were explained, but the present invention is not limited to these embodiments and can be corrected and changed in various ways within the language of the claims. For example, the catalyst may be supported on the filter. Specifically, the catalyst may be coated on the surface of the filter and made integral with the filter. Further, the filter may be omitted. Further, the fuel supplied from the fuel supply device may be a fuel other than diesel fuel such as biodiesel fuel.

Further, step S101 of FIG. 3, step S201 of FIG. 7, and step S301 of FIG. 8 may be omitted, and the control routines of FIG. 3, FIG. 7, and FIG. 8 may be executed at predetermined execution intervals. That is, the control device may periodically calculate the exhaust gas fuel concentration and the fuel saturation vapor pressure concentration and supply fuel from the fuel supply device to the catalyst 28 only if the exhaust gas fuel concentration is higher than the saturation vapor pressure concentration.

Further, the above-mentioned embodiments can be worked freely combined. Specifically, the second embodiment can be combined with the third embodiment. In this case, in the control routine of FIG. 7, step S305 to step S307 of FIG. 8 are performed between step S204 and step S205, while at step S205, the control device continuously or intermittently supplies fuel from the exhaust fuel injector 35 to the catalyst 28 for exactly the calculated fuel supply time. Further, in the control routine of FIG. 7, step S305 to step S307 of FIG. 8 are performed between step S207 and step S208, while at step S208, the control device continuously or intermittently supplies fuel from the exhaust fuel injector 35 and the in-cylinder fuel injector 3 to the catalyst 28 for exactly the calculated fuel supply time.

REFERENCE SIGNS LIST 1 internal combustion engine
3 in-cylinder fuel injector
27 exhaust pipe
28 catalyst
35 exhaust fuel injector
80 electronic control unit (ECU)

The invention claimed is:

1. An exhaust purification system of an internal combustion engine comprising:
 a catalyst arranged in an exhaust passage of the internal combustion engine;

a fuel supply device supplying fuel to the catalyst through the exhaust passage; and a control device configured to control the supply of fuel by the fuel supply device, wherein the control device is configured to calculate a concentration in exhaust gas of fuel supplied to the exhaust passage by the fuel supply device, the concentration of fuel in the exhaust gas being a maximum fuel flow rate of the fuel supply device divided by an exhaust flow rate of the exhaust gas, calculate a saturation vapor pressure concentration of the fuel, the saturation vapor pressure concentration being a saturation vapor pressure divided by an exhaust pressure, compare the concentration of fuel in the exhaust gas to the saturation vapor pressure concentration, and supply fuel from the fuel supply device to the catalyst only when the concentration of fuel in the exhaust gas is higher than the saturation vapor pressure concentration.

2. The exhaust purification system of an internal combustion engine according to claim 1, wherein when the concentration of fuel in the exhaust gas is higher than the saturation vapor pressure concentration, the control device is configured to divide a total demanded amount of liquid phase fuel to be supplied to the catalyst by a flow rate of liquid phase fuel to be supplied to the catalyst to calculate a fuel supply time and supply fuel from the fuel supply device to the catalyst for exactly the fuel supply time.

3. The exhaust purification system of an internal combustion engine according to claim 1, wherein the fuel supply device includes an exhaust fuel injector injecting fuel into the exhaust passage at an upstream side of the catalyst in a direction of exhaust flow and an in-cylinder fuel injector injecting fuel to an inside of a cylinder, and the control device is configured to supply fuel to the catalyst from both of the exhaust fuel injector and the in-cylinder fuel injector so that the concentration of fuel in the exhaust gas becomes higher than the saturation vapor pressure concentration.

4. The exhaust purification system of an internal combustion engine according to claim 2, wherein the fuel supply device includes an exhaust fuel injector injecting fuel into the exhaust passage at an upstream side of the catalyst in a direction of exhaust flow and an in-cylinder fuel injector injecting fuel to an inside of a cylinder, and the control device is configured to supply fuel to the catalyst from both of the exhaust fuel injector and the in-cylinder fuel injector so that the concentration of fuel in the exhaust gas becomes higher than the saturation vapor pressure concentration.

5. The exhaust purification system of an internal combustion engine according to claim 1, wherein the fuel supply device includes an in-cylinder fuel injector injecting fuel into a cylinder, and the control device is configured to calculate the saturation vapor pressure concentration based on a corrected exhaust temperature.

6. The exhaust purification system of an internal combustion engine according to claim 2, wherein the fuel supply device includes an in-cylinder fuel injector injecting fuel into a cylinder, and the control device is configured to calculate the saturation vapor pressure concentration based on a corrected exhaust temperature.

7. The exhaust purification system of an internal combustion engine according to claim 3, wherein the fuel supply device includes an in-cylinder fuel injector injecting fuel into a cylinder, and the control device is configured to calculate the saturation vapor pressure concentration based on a corrected exhaust temperature.

8. The exhaust purification system of an internal combustion engine according to claim 4, wherein the fuel supply device includes an in-cylinder fuel injector injecting fuel into a cylinder, and the control device is configured to calculate the saturation vapor pressure concentration based on a corrected exhaust temperature.

9. The exhaust purification system of an internal combustion engine according to claim 1, wherein a turbine is arranged between the fuel supply device and the catalyst, and the control device is configured to calculate the concentration of fuel in the exhaust gas while considering dispersion of fuel by the turbine.

10. The exhaust purification system of an internal combustion engine according to claim 2, wherein a turbine is arranged between the fuel supply device and the catalyst, and the control device is configured to calculate the concentration of fuel in the exhaust gas while considering dispersion of fuel by the turbine.

11. The exhaust purification system of an internal combustion engine according to claim 3, wherein a turbine is arranged between the fuel supply device and the catalyst, and the control device is configured to calculate the concentration of fuel in the exhaust gas while considering dispersion of fuel by the turbine.

12. The exhaust purification system of an internal combustion engine according to claim 4, wherein a turbine is arranged between the fuel supply device and the catalyst, and the control device is configured to calculate the concentration of fuel in the exhaust gas while considering dispersion of fuel by the turbine.

13. The exhaust purification system of an internal combustion engine according to claim 5, wherein a turbine is arranged between the fuel supply device and the catalyst, and the control device is configured to calculate the concentration of fuel in the exhaust gas while considering dispersion of fuel by the turbine.

14. The exhaust purification system of an internal combustion engine according to claim 6, wherein a turbine is arranged between the fuel supply device and the catalyst, and the control device is configured to calculate the concentration of fuel in the exhaust gas while considering dispersion of fuel by the turbine.

15. The exhaust purification system of an internal combustion engine according to claim 7, wherein a turbine is arranged between the fuel supply device and the catalyst, and the control device is configured to calculate the concentration of fuel in the exhaust gas while considering dispersion of fuel by the turbine.

16. The exhaust purification system of an internal combustion engine according to claim 8, wherein
    a turbine is arranged between the fuel supply device and the catalyst, and
    the control device is configured to calculate the concentration of fuel in the exhaust gas while considering dispersion of fuel by the turbine.

\* \* \* \* \*